United States Patent [19]

Walsham et al.

[11] 4,169,355
[45] Oct. 2, 1979

[54] TURBOCHARGER WASTEGATE VALVE

[75] Inventors: Brian E. Walsham, Holmfirth; William K. Bruffell, Mirfield; Howard S. Atkin, Leeds, all of England

[73] Assignee: Holset Engineering Company Limited, Turnbridge, England

[21] Appl. No.: 857,544

[22] Filed: Dec. 5, 1977

[30] Foreign Application Priority Data

Dec. 3, 1976 [GB] United Kingdom ............... 50429/76

[51] Int. Cl.² ..................... F02B 33/44; F02D 23/00
[52] U.S. Cl. ........................ 60/682; 60/602; 60/611; 60/660; 137/801; 415/13; 415/39; 415/28; 415/145
[58] Field of Search .............. 137/801; 60/600, 602, 60/603, 605, 608, 611, 660, 650, 682; 415/13, 27, 28, 29, 39, 144, 145

[56] References Cited

U.S. PATENT DOCUMENTS

| 3,443,376 | 5/1969 | Light | 60/602 |
| 3,611,711 | 10/1971 | Mueller | 60/600 |
| 4,005,578 | 2/1977 | McInerney | 60/602 |

Primary Examiner—Allen M. Ostrager
Attorney, Agent, or Firm—Gary M. Gron; Robert T. Ruff

[57] ABSTRACT

The disclosure illustrates a turbocharger wastegate valve comprising a cylindrical chamber connected through a radial inlet to the gas stream upstream of the turbine. High pressure air is selectively directed across the inlet through a nozzle to prevent or permit flow into the chamber which is connected to a point downstream of the turbine. The pressure of the air delivered to the nozzle may be varied to proportion the gases bypassed around the turbine.

9 Claims, 4 Drawing Figures

TURBOCHARGER WASTEGATE VALVE

The present invention relates to a wastegate valve for use in connection with a turbosupercharged internal combustion engine, to a combination of a valve and a turbosupercharger or a turbocharger and to a method of operating the turbocharger.

In the operation of internal combustion engines the requirement for higher torque at lower engine speeds may be met in turbocharged engines by an adjustment of the turbine of the turbocharger to deliver air at higher pressure thus supplying more air to the engine.

The pressure developed by a centrifugal type of turbocharger however, varies as the square of the speed. An increase in delivery pressure sufficient to provide the required increased torque at low engine speed will thus greatly increase the delivery pressure at higher engine speed. This problem has been overcome by incorporating a wastegate valve into the turbine side of the turbocharger which will allow engine exhaust gas to bypass the turbine nozzle and wheel as required. Valves currently in use for bypassing the turbine nozzle and wheel are of a mechanical type and usually comprise a spring biased poppet valve arranged to open against the spring bias when the gas pressure entering the turbine wheel or the engine boost pressure exceeds a certain level. Opening of the poppet valve allows part of the exhaust gases to pass through the valve and to bypass the turbine nozzle and wheel. Such valves are, however, unreliable because the preponderance of closed (i.e. low speed) running leads to an inbuilt propensity for seizing in the closed position.

According to the present invention there is provided a combination of a turbocharger for an internal combustion engine and a fluidic valve, said fluidic valve being located and arranged such that in operation the amount of operating gas (e.g. exhaust gas) reaching the turbine wheel may be varied in dependence upon a selected parameter.

Preferably the valve is arranged to be biassed to a condition in which the bypass is open in the event of failure or interruption of the supply of control fluid.

The control fluid for the valve may be the boost air, the exhaust gas, braking air or any other supply and, where the parameter is the pressure of the supply, may be used direct (i.e. without additional control).

The fluidic valve preferably comprises an inlet for connection to a manifold leading to the turbine inlet, a cylindrical chamber having an outlet therefrom and a control port for admitting control fluid at high velocity. The inlet may be of any convenient section, but preferably is radially disposed with respect to the chamber. In preferred embodiments a baffle is positioned in the inlet in order to assist in control of the flow of exhaust gas e.g. by biasing the direction of flow of exhaust gas. The control port is preferably located adjacent the point at which the inlet connects with the chamber and is directed perpendicular to the main axis of the inlet. If desired more than one control port may be included. In fact, as many control ports as may be desirable or necessary up to the limits imposed by the size of the chamber may be used. The use of additional ports enables variation in the control to be achieved. For example, one control port may be used to bias the flow of exhaust gas and another may be used to initiate switching between one direction of flow and another. Another possibility is that one control port may be used to operate in response to a first parameter and a second control port may be used to operate in response to a second parameter.

The invention will now be further described by way of example with reference to the accompanying drawings, in which, FIG. 1 is an end view of a fluidic valve used in accordance with the invention attached to an exhaust duct of an internal combustion engine.

Figure 3:
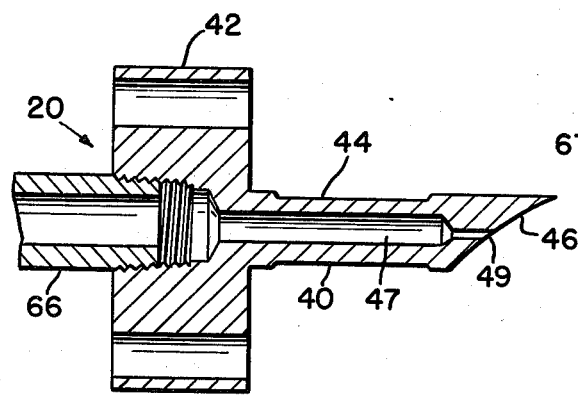
FIG. 3 is an enlarged view of a part of the device of FIGS. 1 and 2.
Figure 4:
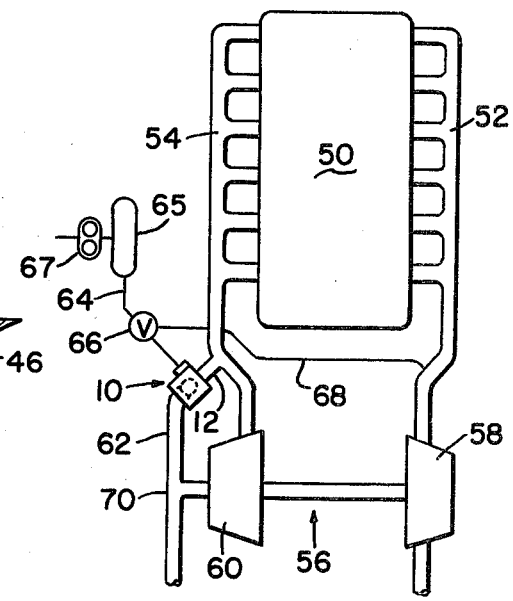
FIG. 4 is a diagrammatic representation of an engine and turbocharger combustion including a fluidic device in accordance with the invention.

Referring first to FIG. 4, there is shown diagrammatically a combination of an internal combustion engine, a turbocharger and a fluidic valve embodying the present invention. An engine 50 has an inlet manifold 52 and an exhaust manifold 54. A turbocharger indicated generally by the reference numeral 56 is arranged so as to supply air under pressure from compressor section 58 of the turbocharger 56 to the inlet manifold 52. The compressor 58 is driven by a turbine 60 which receives exhaust gas from the engine 50 via exhaust manifold 54. Connected to exhaust manifold 54 is a duct 12 extending to a fluidic valve 10 of the type shown in FIGS. 1 to 3. A duct 62 leading from the fluidic valve 10 extends to the exhaust duct 70 for the turbine 60. A line 64 connects with a reservoir of high pressure air from a braking system reservoir 65. Reservoir 65 is pressurized by an air compressor 67 generally driven by engine 50. Control of the amount of high pressure air allowed into the fluidic valve 10 is provided by a pressure responsive valve 66 interposed in line 64 and responsive to the discharge pressure of compressor 58 via interconnecting line 68.

Figure 1:
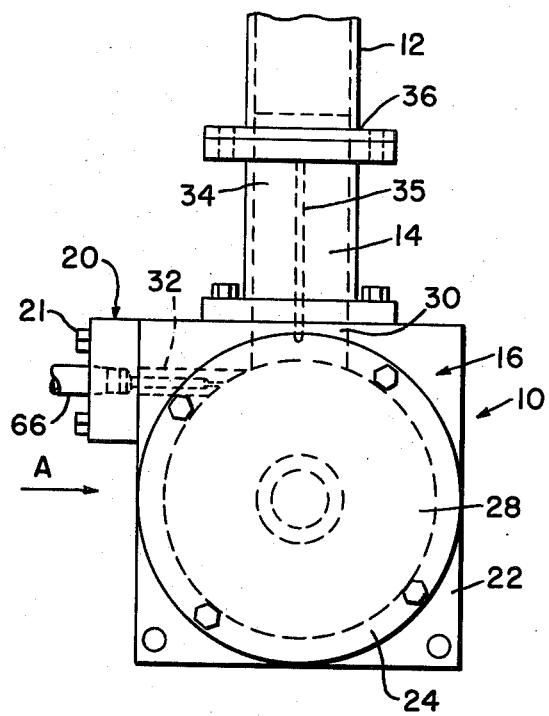
Figure 2:
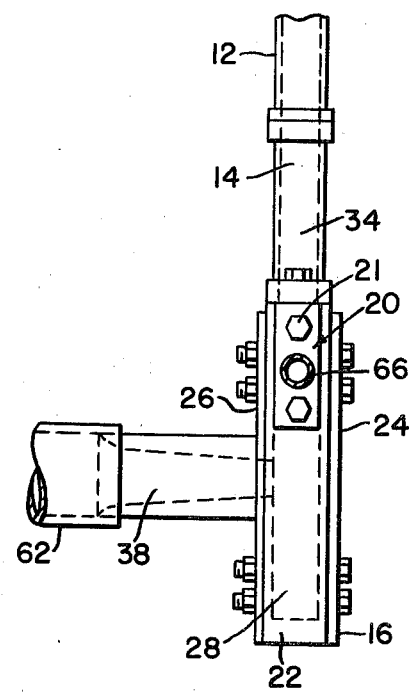
FIG. 2 is a side view of the arrangement shown in FIG. 1 in the direction of arrow A shown in FIG. 1.

Referring to FIGS. 1 to 3, the fluidic valve 10 comprises four main parts, an inlet duct 14, a valve body 16 and an outlet duct 18 and a control port holder 20. The valve body 16 is formed from a block 22 and cover plates 24,26 bolted to the block 22. The block 22 has a cylindrical opening therethrough forming a cylindrical valve chamber 28. An inlet passageway 30 through block 22 connects with the chamber 28. Cover plate 26 includes a central outlet aperture 27 connecting with the valve chamber 28. The block 22 also includes an aperture 32 adjacent to the passageway 30 to accomodate part of the control port holder 20.

The inlet duct 14 is bolted at one end to the valve body 16 so that passageway 34 aligns with the inlet opening 30 in the block 22, and at the other end to the exhaust ducting 12 such that passageway 34 aligns with an opening 36 in the exhaust ducting 12. A baffle 35 extends across the passageway 34 thereby dividing the passageway into two. Outlet duct 18 which includes a divergent passageway 38 is bolted to the valve body 22 so that the narrower end of passageway 38 aligns with the outlet aperture 27.

The control port holder 20 (shown in greater detail in FIG. 3) comprises an elongate portion 40 which is accomodated in aperture 32 and a flanged portion 42 to enable the holder 20 to be secured to the block 22 by bolts 21. A passageway 44 extends through the flanged portion 42 and the elongate portion 40 of the holder 20. The end 46 of the elongate portion 40 of the holder 20 is shaped to continue the curved surface of the chamber 28 and the end of the passageway 44 remote from the chamber 28 is widened and screw threaded as at 48 to receive a connection (not shown) from a source of fluid under pressure. Passageway 44 includes an intermediate diameter portion 47 and a small diameter portion 49 defining an orifice or nozzle.

In operation exhaust gases pass along exhaust manifold 54 from the engine 50 to the turbine 60 of the turbocharger 56. Duct 12, fluidic valve 10 and duct 62 provide a path for hot gases to bypass the turbine 60. The amount of gas which passes through passageway 34, chamber 28 and outlet duct 18 will vary dependent upon the amount of fluid fed to the chamber 28 via nozzle 49. During low engine speed operation when the maximum amount of exhaust gas is required at the turbine, the amount of fluid entering chamber 28 via passageway 44 is increased by increasing the pressure in line 64 by valve 66 to a level substantially greater than the level of exhaust gases so that little or no exhaust gas bypasses the turbine. The reason this happens is that the nozzle 49 discharges air in a high velocity stream around the curved perifery of the cylindrical chamber 28. A vortex flow therefore is set up within the chamber to provide a pneumatic barrier against the entry of gases from inlet 30.

As engine speed increases and less exhaust gas is required at the turbine. The amount of fluid passed via nozzle 49 to the chamber 28 is decreased by either progressively or in a stepwise (single or multiple step) manner lowering pressure in line 64. This reduces the strength of the vortex flow thereby allowing greater amounts of exhaust gas to pass through the valve and then bypass the turbine 60.

As illustrated herein in fluidic valve 10 may be made responsive to one or more operating parameters to control the operating condition of the turbine or output pressure of the compressor 58. The pressure responsive valve 66 is connected to the discharge pressure of compressor 58. It may be the type of valve that reduces pressure at the control port holder 30 in a step fashion to a very low level in response to an increase of compressor discharge pressure about a given level. When that happens the vortex flow in chamber 28 is substantially eliminated thus permitting maximum bypass flow around turbine 60. Alternatively valve 66 may be a type which reduces pressure at control port holder 20 in a gradual fashion as the compressor discharge pressure is increased to the given level. This allows for a more gradual modulation of the turbine speed, which in turn results in a less abrupt modulation of compressor discharge pressure.

The pressure level necessary at the control port holder 20 to provide complete cutoff is a function of many operating variables. However for one example, a pressures of 100 psi gave substantially complete cutoff of bypass flow.

Although a specific embodiment has been described, it will be apparent that other forms may be used without departing from the spirit and scope thereof.

Having thus described the invention what is novel and desired to be secured by Letters Patent of the United States is:

1. In combination:
   a turbine rotatable in response to a hot gas stream;
   means for directing a hot gas stream to and across said turbine;
   means for selectively bypassing said hot gas stream around said turbine; said bypassing means comprising:
   means defining a cylindrical chamber having a radially directed inlet from a point upstream of said turbine and an outlet connected to a point down stream of said turbine,
   means for selectively directing at least one gas stream at high velocity across said radially directed inlet generally at a right angle relative to the gas issuing from said inlet and tangetial to said chamber for selectively preventing flow into said chamber,
   whereby hot gases are bypassed around said turbine in the absence of said high velocity stream and substantially directed across said turbine when said high velocity stream exists.

2. Apparatus as in claim 1 wherein the outlet to said cylindrical chamber is positioned in line with the central axis thereof.

3. Apparatus as in claim 1 wherein said selective directing means comprises means for forming a nozzle opening into the curved wall of said chamber.

4. Apparatus as in claim 3 wherein said nozzle means comprises a base securable to the exterior of said chamber forming means and an elongate portion received in an aperture in said chamber forming means, said elongate portion having a passageway extending to said base and an orifice adjacent said chamber thereby forming said nozzle.

5. Apparatus as in claim 4 wherein said elongated portion extends to the turned wall of said chamber and has an end face curved to be flush with said curved wall.

6. Apparatus as in claim 4 wherein said chamber forming means comprises a block having a circular opening therethrough and cover plates secured to opposite sides thereof, said circular opening and cover plates forming said cylindrical chamber.

7. Apparatus as in claim 6 wherein said inlet is formed through said block in a direction that is generally radial with respect to said cylindrical chamber, said apparatus further comprising a divider for separating the flow in said inlet into two streams.

8. Apparatus as in claim 1 further comprising:
   means for pressurizing air to a level substantially higher than the pressure level of the hot gas stream connected to said inlet,
   means for selectively connecting the output of said air pressurizing means to said high velocity gas stream means.

9. Apparatus as in claim 8 further comprising:
   a compressor driven by said turbine to produce a variable pressure output;
   means for communicating the variable pressure output of said compressor to said selective connecting means being responsive to pressure to permit flow from said high velocity gas stream means only when the compressor pressure is below a given level.

* * * * *